Patented July 11, 1939

2,165,370

UNITED STATES PATENT OFFICE 2,165,370

CARCINOMA ANTIGEN

Benjamin Gruskin, Philadelphia, Pa., assignor to Lakeland Foundation, Chicago, Ill., a corporation of Illinois No Drawing. Application October 6, 1936, Serial No. 104,341

11 Claims. (Cl. 167—78)

This invention relates to a substance commonly called an antigen.

More specifically the invention is concerned with the diagnosis of malignant tumors and comprehends the provision of an extract of a material comprising a characteristic protein which will incite a specific sensitization to a homologous protein contained in the body of an animal by producing a pseudopodic reaction when introduced intradermally into the said animal body. In view of this action the present agent or antigen may also or alternatively be termed a sensitizing agent. By the term "antigen" as used in the following specification and claims it is intended to cover and refer to such products.

More particularly, the invention contemplates the provision of an antigen for use in the diagnosis of malignant tumors known as cancer, there being two types of malignant tumors, namely, carcinoma and sarcoma. Malignant tumors are of two types which are the epithelial (cells forming an unbroken sheet or membrane) type, known as carcinoma, and the connective tissue type, known as sarcoma. This invention and discovery relates to the antigen for use in connection with the diagnosis of the epithelial type of tumor, which is carcinoma.

This application is a continuation in part of applications Serial Nos. 636,019 and 636,020, each filed October 3, 1932, and application Serial No. 731,113, filed June 18, 1934.

The present invention is based upon and explained by the following theory which is set out herein for the purpose of better defining the invention and the principles involved therein, namely, that malignant tumor cells are embryonic in their inception and continue to remain embryonic, in contra-distinction to other cells of the body which are embryonic in inception but later mature. That is to say, the epithelial cells of carcinoma never mature but tend to remain in their embryonic form, thus characterizing the onset of the disease.

It is a biological fact that if an extract of a known homologous protein, which is a substance characteristic of living matter, is added to or brought into contact with serum of an animal that has been injected with that protein, a precipitation or flocculation takes place. This biological fact is conventionally availed and employed in the identification of various types of proteinaceous animal products, for example, by inspection agencies. Therefore, upon the theory herein expounded, and of which innumerable tests have proven correct, an antigen made of epithelial embryonic cells added to or brought into contact with the serum of a patient suffering from carcinoma, causes a flocculation or precipitation to take place; or causes a reaction or immunization to take place. So also, when an antigen made from embryonic epithelial cells and containing a specific protein homologous to the protein characteristic of carcinoma is intradermally injected into the body of a patient suffering from carcinoma a characteristic allergic or pseudopodic reaction occurs.

The primary object of the present invention is to provide a new and improved antigen or sensitizing agent prepared from embryonic epithelial cells obtained from embryo mammals, and particularly from a gland of the abdomen, known as the pancreas, a gland of the jaw, known as the sub-maxillary gland, or from the liver of the embryo, or any combination thereof.

Another object of the invention and discovery is to provide a method of making an antigen from the embryonic epithelial cells obtained from embryo mammals.

A further object is to provide a new antigen for determining whether or not a human being is afflicted with carcinoma by injecting the antigen intradermally into the body of the human being for diagnostic purposes.

An additional object is to provide a highly perfected method of synthesis for an antigen whereby a pure antigen is obtained which in use is characterized by a high degree of accuracy.

A still further object of the invention and discovery is to provide a test to determine whether or not a human being is afflicted with carcinoma by giving intradermal injections of a suitable antigen and preserving the results of the injections particularly with regard to the formation or absence of formation of pseudopods, the occurrence of a pseudopodic reaction indicating positively the presence of specific carcinomatous protein in the body of the patient and, accordingly, the presence of a carcinomatous growth in the individual.

A further object is the provision of an antigen compounded or formulated from embryonic epithelial cells which are preferably taken from a gland of the abdomen known as the pancreas, glands of the jaw known as submaxillary glands, or from the liver of embryo mammals of various kinds including sheep but preferably from calves.

A still further object is the method of making an antigen from the cells of embryo mammal pancreas, submaxillary glands or liver which consists in preparing, treating and mixing the cells to obtain a protein prepared and treated in accordance with a predetermined sequence and formula.

Numerous other objects and advantages will be apparent throughout the progress of the following specification in which the invention and discovery is fully explained.

Proceeding on the basis that carcinoma cells are embryonic epithelial cells, always remain embryonic and never mature, a protein from these cells, when brought into contact with a patient's serum containing a characteristic carcinomatous protein, causes a precipitation or flocculation, or a reaction or immunization to take place.

The embryonic epithelial cells from which the antigen is made, can be had from embryonic mammas, preferably not more than five weeks old at a time when the foetus remains sterile and before there is any hair on the embryo,—embryo calves from healthy cows are preferable. In carrying out the invention and discovery it is preferable that the embryonic epithelial cells for use in compounding the antigen be obtained from the liver, the pancreas, or the sub-maxillary glands of the embryo calf.

Moreover, the embryo should not be greater than fourteen inches long, as the antigen produced from a larger embryo lacks in some degree the properties of a body containing true embryonic epithelial cells. In addition, while there may be a class of animals known as "reactors" which are permitted to be slaughtered for food purposes, these animals are not employed in the illustrative embodiment, in view of the incidence of certain disease characteristics.

While the method of compounding the antigen is the same regardless of whether liver, pancreas or sub-maxillary glands are used, the antigen and method of making it will be limited to liver. In other words, the method of making the antigen is exactly the same regardless of the materials used, the cells of one member being merely substituted for the cells of another.

The cells for making the antigen are obtained from embryo mammal pancreas, sub-maxillary glands or liver, but preferably from the liver of embryo calves from healthy cows. The embryo calves must not be more than five weeks to two months old and should be hairless. The liver is obtained from the embryo calf without damaging the liver or gall bladder. The gall bladder should be removed from the liver without cutting into the gall bladder and care should be taken so that none of the liquid in the bladder will come in contact with the liver. The liver so obtained is carefully washed with water to wash all blood from the surface of the liver. Any part of the tissue of the liver which appears to have a yellow color should be discarded and any loose ends of blood vessels and fat on the liver should be also discarded. The liver is peeled of its capsule with blunt forceps. It is preferable that the liver be kept moistened when the capsule is removed because if not kept moist, the surface of the liver will tend to dry out and therefore the capsule can only be removed with difficulty. After the liver, or the livers, is washed and treated as above described, it is placed in an Erlenmeyer flask which is slightly larger than the bulk of the liver. Water is then added to the liver in the flask and the flask is shaken gently to wash the cells from the framework of the liver. The reason for putting a sufficient quantity of liver in the Erlenmeyer flask is to permit the water to circulate freely through the framework of the liver without causing the liver to splash or knock against the side of the flask. The supernatant water containing the cells which have been washed free from the framework of the liver is then poured off into a beaker and fresh water is added from time to time to the liver in the flask and the flask is shaken gently until the framework of the liver begins to appear. This framework of the liver structure is discarded and the supernatant fluid containing the cells is gathered in the aforesaid beaker.

The supernatant water containing the cells and which has been collected in the aforesaid container, is then filtered through three thicknesses of surgical gauze in order to remove any capsule which may have been missed during the cleaning process of the lever and to remove any pieces of liver tissue which may have broken off from the framework of the liver during the process of washing away the cells.

The filtered solution containing the cells is then placed in test tubes and centrifuged at a medium speed for about four minutes. The centrifuging causes the cells to collect in the bottoms of the tubes. The water is then poured off, leaving only the cells collected in the bottoms of the tubes.

Over the mass of cells is usually a layer of whitish gray, homogenous, fatty appearing material which is not composed of liver cells but probably lipoids and other foreign matter which has been carried through in the process. I therefore, in order to separate this material, permit a stream of water to run down the side of the tube. The water tends to wash or flood this layer of material loose from the cells with the result that it floats up on top. By slowly adding sufficient water to overflow the test tube, this layer may be caused to bodily flow off and separate. The water in the test tube is then poured off to remove any additional such material it may contain.

To the cells which remain in the tubes, there is added an amount of water equal to the amount which was poured off after the centrifuging operation. The tubes are then shaken to mix the cells with the water to clean them. The tubes containing the cells with the fresh water are again centrifuged for a period of about four minutes at medium speed. After the second centrifuging operation, the supernatant water is again poured off. A layer of the whitish gray impurity mentioned above may again appear and is removed in the same manner, i. e., by flowing into the tube a stream of water and flooding off the impurities.

Then saline solution is added to the cells and shaken with the cells. The saline solution is made in the proportion of 8.5 grams of sodium chloride to one thousand cubic centimeters of water. The cells which are in the tubes containing the saline solution are then centrifuged for a period of about four minutes when the supernatant solution is again poured off. This process of washing the cells with the saline solution is repeated until the supernatant solution is clear at the end of the centrifuging operation. Usually three such washings with saline solution are sufficient to render the supernatant solution clear.

After the final washing with saline solution, the supernatant solution is poured off and ether, i. e., ethyl ether, known commercially as sulfuric ether, is added to cover the cells, preferably in three times the approximate volume of the cells. The mixture is shaken to completely wash the cells therein and is permitted to stand for two hours. The container is carefully covered meanwhile. After this period the ether may be poured off. If sufficient settling has not taken place, the product should be centrifuged at a medium speed for five minutes or so when the ether may be readily decanted from the mass of cells. After this operation, it is preferred that the mass of cells, still wet with ether, be permitted to dry. This is, of course, readily accomplished in view of the volatile nature of ether. Fresh ether is again added in about the same amount as before and the operation again carried out in the same manner. This operation is repeated until the cells have been washed in ether for three separate times.

After the cells have been washed in the ether solution for the last time, the supernatant solution is poured off and acetone is added to the cells in the proportion of three parts of acetone to one part of the cells. These latter amounts are determined roughly by volume. The cells are then shaken thoroughly with the acetone after which time the acetone containing the cells is poured into a flask. The flask should be stoppered in order to prevent further absorption of moisture from the air by the acetone. The cells are allowed to remain in the acetone for about one hour, when they are centrifuged with the acetone for about five minutes. The supernatant acetone is then poured off and discarded and fresh acetone in the proportion of three parts of acetone to one part of cells is added to the cells. The cells are then again shaken with the acetone and allowed to remain in the acetone for a period of approximately twelve hours. The container containing the acetone and cells should be stoppered.

After the cells have been in the acetone for approximately twelve hours as just described, the cells and acetone are shaken together and the fluid is poured into tubes and centrifuged at medium speed for about five minutes. After the centrifuging operation, the supernatant acetone is poured off and the cells are shaken out of the tubes onto a flat dish. They are then gently stirred with a spatula to assist in the aeration of the cells, and to hasten the evaporation of the acetone. When the cells are thoroughly dry and no odor of acetone can be detected, the cells are put into sterile glass bottles or tubes which are stopped with air-tight stoppers.

The dry cells of the embryo liver, which are obtained by the process just described, are extracted with one-tenth normal sodium hydroxide (NaOH, C.P.) in the proportion of one-tenth gram to two-tenth gram, preferably two-tenth, of the cells to ten cubic centimeters of the one-tenth normal sodium hydroxide.

The sodium hydroxide (NaOH, C.P.), one-tenth normal solution, is made up in the proportion of four grams of sodium hydroxide (C.P.) to one liter of distilled water, in a volumetric flask.

To one to two grams of dried embryo liver cells there is added slowly one hundred cubic centimeters of the one-tenth normal sodium hydroxide. The cells are first ground to a smooth paste with a few cubic centimeters (about 5 c. c.) of the sodium hydroxide, and then the remaining amount of the sodium hydroxide is added slowly. Care should be taken in mixing the cells and the sodium hydroxide so that a smooth suspension of the cells in the sodium hydroxide is obtained. The extract of the cells and sodium hydroxide is then put into large test tubes or in a straight sided cylinder and allowed to stand for twenty-four hours. After this time, it is preferred that the liquid and its contents be centrifuged at medium speed for twenty minutes in order to permit complete and full separation of the supernatant liquid, which may then be pipetted off or otherwise separated.

The supernatant solution which is pipetted off from the cells should be measured with a sterilized graduate. This supernatant solution which is an alkaline extract, is then placed in a sterile bottle of a volume more than twice that of the extract to allow for the addition of an acid and buffer solution which is used in neutralizing the aforesaid alkaline solution. The acid and buffer solution for neutralizing the alkaline extract comprises two and twenty-seven hundredths grams of anhydrous C.P. primary potassium phosphate ($KH_2PO_4$) and four and two hundred thirty-five thousandths cubic centimeters of concentrated hydrochloric acid (HCl), C.P., specific gravity 1.18–1.19, 35% solution, made up to one liter of distilled water in a volumetric flask. This gives a solution which is .05 normal with respect to hydrochloric acid and which is .05 normal with respect to primary potassium phosphate, anhydrous.

An equal amount of the acid and buffer solution just described, consisting of .05 normal hydrochloric acid and .05 normal primary potassium phosphate, is added to the alkaline solution which has been pipetted off from the cells and measured. The acid and buffer solution should be added slowly and the resultant solution carefully stirred or gently agitated when the acid and buffer solution is being added to the alkaline solution or extract. After an equal amount of the acid and buffer solution has been added to the alkaline extract of the cells, a few more cubic centimeters of the acid and buffer solution should be added. The solution should then be tested to see if the neutralization is nearing the end point. This testing should be repeated frequently to make certain that the titration does not go past the end point which is pH 6.9 for this process. If the solution becomes too acid, the protein of the antigen will be precipitated. The antigen should be checked electrometrically if possible, and if not, it may be checked by the use of a spot plate and checked against a standard solution of a pH of 6.9, using brom-thymol-blue as an indicator.

The standard solution may be made up of anhydrous primary potassium phosphate $1/15$ molar, 9.078 grams of pure crystalline salt in one liter of freshly distilled water in a volumetric flask and anhydrous secondary sodium phosphate, $1/15$ molar, 9.472 grams of pure crystalline anhydrous salt in one liter of freshly distilled water in a volumetric flask. These two solutions are mixed in a "Pyrex" container in the proportion of 4.9 parts of the solution of potassium phosphate to 5.1 parts of the solution of secondary sodium phosphate. The mixture of the two solutions gives a solution with a pH of 6.9.

The solution is now passed through a number 5 Berkfield filter to remove any foreign matter or bacterial contamination. This filtering step may be applied prior to the addition of acid and buffer in another preferred embodiment of the invention, that is, after decantation or pipetting off of the supernatant alkaline extract.

When the end point of the titration has been reached, as ascertained by the electrometric method or by the matching of the antigen to the standard solution of pH 6.9, by means of the spot plate method using bromthymol-blue as an indicator, a preservative may be added. The preservative consists of a solution of tri-cresol in C. P. glycerine, in the proportion of one part of tri-cresol to two parts of glycerine.

The total volume of the antigen including the original volume of the alkaline extract and the added volume of the acid and buffer mixture is then calculated and to each ten cubic centimeters of the antigen two drops of the tri-cresol and glycerine preservative are added from a capillary pipette. The pipette used has an end bore of one millimeter internal diameter. A sterile stopper should be placed on the bottle containing the antigen and the added solutions should be shaken thoroughly so that the preservative will be evenly dispersed throughout the solution. A rubber stopper of the cap type, which may be punctured by a needle attached to a syringe, is preferably used on the bottle containing the antigen as the bottle need not be opened to withdraw the solution.

After the preservative has been added to the antigen and the solution thoroughly shaken, the finished antigen is heated to about 80° C. for five minutes. This treatment apparently has the function of destroying or changing to a harmless form certain impurities which might interfere with the use of the antigen.

The resultant antigen may be drawn from the large containers by means of a Pyrex syringe and put into small vials for use. Vials preferably of a size of five cubic centimeters capacity have been found convenient.

It is essential to use glass containers of Pyrex for the reason that ordinary glass seems to give up alkali to the product and thus change its character.

Five hundredths of 1 c. c. of the above antigen (either obtained from the pancreas, sub-maxillary glands, or the liver) is drawn off in a small syringe to which there is attached a very fine short needle. The antigen is injected intradermally, after first sterilizing and treating the surface of the patient's skin and rendering it perfectly dry. The injection is performed by stretching the skin with one hand and injecting the antigen intradermally, the injection being made by the usual intradermal method. In positive cases, that is, in cases where the patient examined has carcinoma, a slight area of inflammation will be noticed surrounding the small bubble termed a "bleb", which occurs from the injection, and pseudopods will form, pseudopods being radial elongations extending outwardly from the edges of the bleb. In negative cases, that is, in cases where the patient does not have carcinoma, no pseudopod formation will take place.

The invention and discovery herein set forth designates, to a high degree of certainty, whether or not a patient is afflicted with carcinoma. The antigens herein described are made from embryonic epithelial cells of mammals, and while the exact method herein described is preferable, as it has been actually tried out and used, it is to be understood that changes, to certain degrees, may be made, without departing from the spirit of the invention or sacrificing any of its advantages, and the right is hereby reserved to make all such changes as fairly fall within the scope of the following claims.

The invention is hereby claimed as follows:—

1. The method of making an antigen for injection intradermally in a body to determine if carcinoma exists in a body which consists in suspending a protein of epithelial embryonic cells which are obtained from the sub-maxillary glands of embryonic mammals in a solution of decinormal sodium hydroxide, separating the extracted protein, neutralizing and buffering, passing through a bacteria proof filter, and heating to about 80° C.

2. The method of making an antigen which consists in obtaining embryonic epithelial cells from embryonic mammals, washing the cells first with ether followed by washing with acetone, obtaining the protein of said saids, treating the protein with deci-normal sodium hydroxide to make a solution, and then neutralizing the solution to a pH of 6.9.

3. An antigen specific to the diagnosis of carcinoma by intradermal injection comprising a neutralized, inorganic alkaline hydroxide extract of embryonic epithelial cells.

4. An antigen specific to the diagnosis of carcinoma by intradermal injection comprising a neutralized, inorganic, alkaline hydroxide extract of embryonic epithelial cells obtained from embryo mammals having a pH of substantially 6.9.

5. An antigen specific to the diagnosis of carcinoma by intradermal injection comprising a neutralized, sodium hydroxide extract of embryonic epithelial cells from embryo mammals.

6. The process of making an antigen for intradermal use to determine diagnostically the existence of carcinoma comprising extracting embryonic epithelial cells obtained from embryo mammals with an inorganic alkaline hydroxide, separating the extract, and then neutralizing the extract.

7. The process of making an antigen for intradermal use to determine diagnostically the existence of carcinoma comprising obtaining an inorganic alkaline hydroxide extract of embryonic epithelial cells, and then adding an acid and buffer solution to reduce the extract to a pH of approximately 6.9.

8. An antigen to determine diagnostically the existence of carcinoma in a mammalian comprising an extract of embryonic epithelial cells obtained from embryo mammals and adapted for intradermal injection, which extract contains a specific protein homologous to the specific carcinomatous protein of a mammalian having carcinoma and which produces a skin reaction by pseudopod formation when the antigen is injected intradermally into an animal afflicted with carcinoma.

9. An antigen specific to the determination of carcinoma by intradermal injection comprising a neutralized, sodium hydroxide extract of embryonic epithelial cells of embryo mammals, said extract having a pH of substantially 6.9.

10. The process of making an antigen for intradermal use to determine diagnostically the existence of carcinoma comprising extracting embryonic epithelial cells obtained from embryo mammals with sodium hydroxide, separating the extract, and then neutralizing the extract with an alkali phosphate and hydrochloric acid.

11. The process of making an antigen for intradermal use to determine diagnostically the existence of carcinoma comprising extracting embryonic epithelial cells obtained from the liver, pancreas or sub-maxillary gland of embryo mammals with one-tenth normal sodium hydroxide, and then adding an acid and buffer solution to neutralize the extract to a pH of about 6.9.

BENJAMIN GRUSKIN.